June 2, 1925.

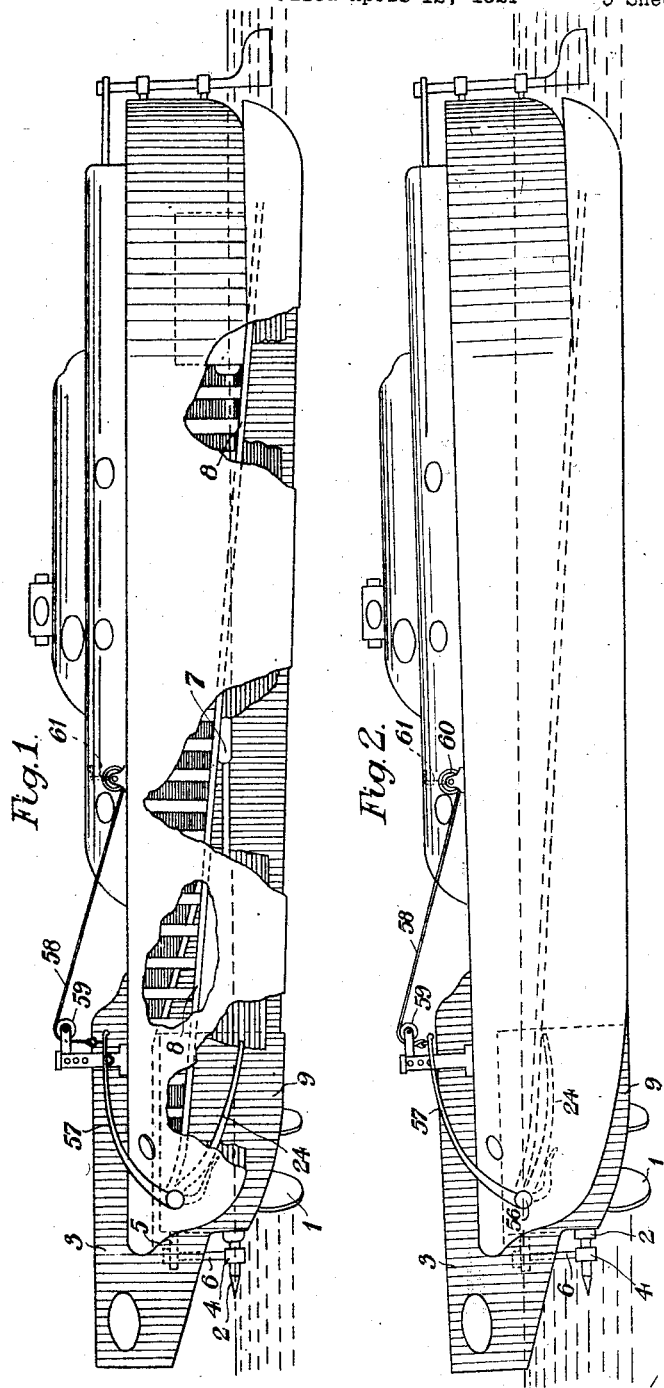

H. CLAY

PROPULSION OF SHIPS AND LIKE VESSELS

Filed April 12, 1921    5 Sheets-Sheet 2

INVENTOR:
Henry Clay
By Wm Wallace White
ATTY.

June 2, 1925.

H. CLAY 1,540,056

PROPULSION OF SHIPS AND LIKE VESSELS

Filed April 12, 1921 5 Sheets-Sheet 3

INVENTOR:
Henry Clay
By Wm Wallace White
ATTY.

June 2, 1925.
H. CLAY
1,540,056
PROPULSION OF SHIPS AND LIKE VESSELS
Filed April 12, 1921   5 Sheets-Sheet 4
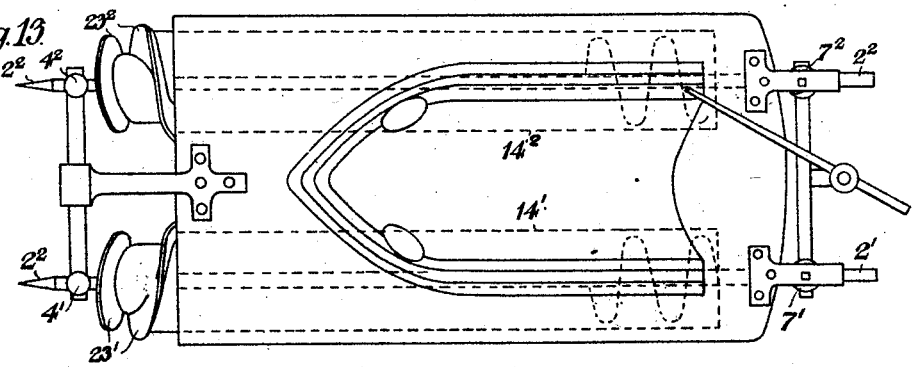
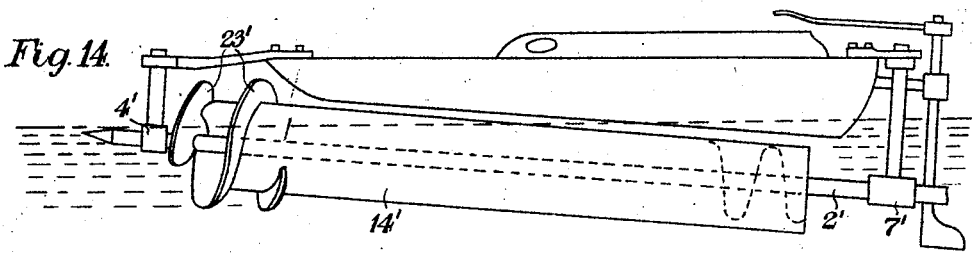
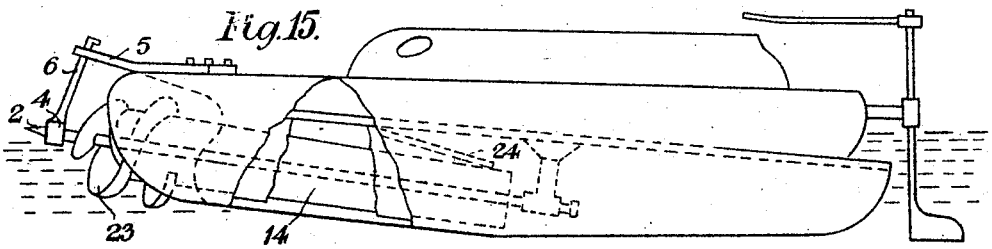
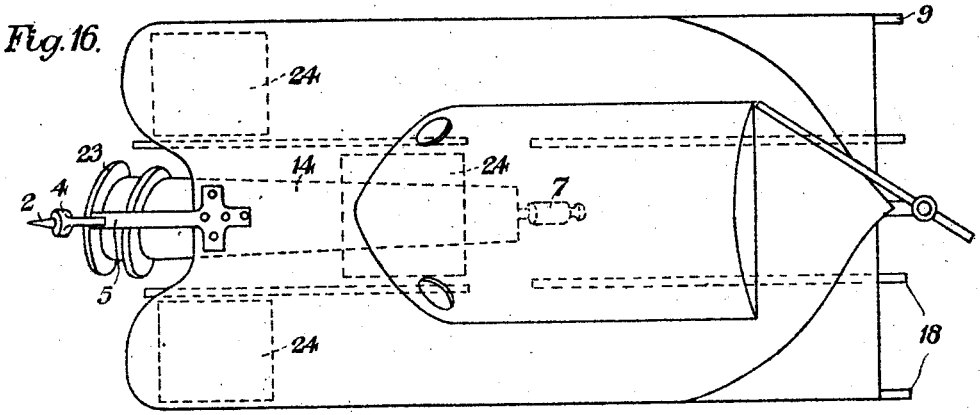
INVENTOR:
Henry Clay
By Wm Wallace White
ATTY.

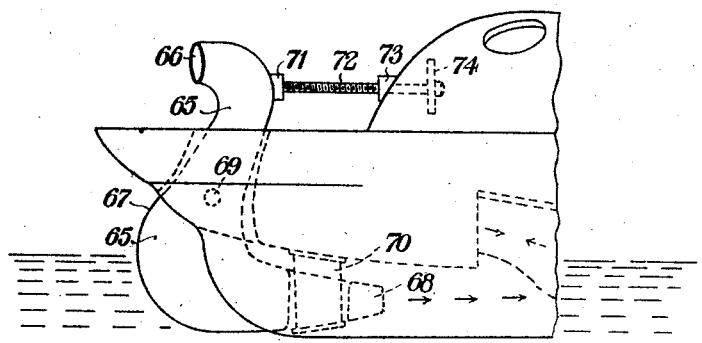
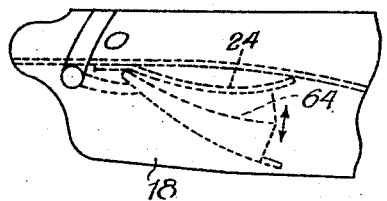
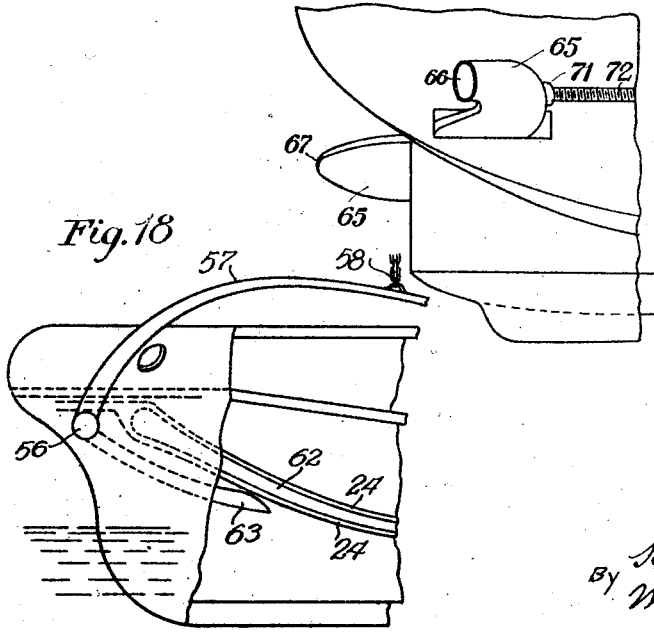

Patented June 2, 1925.

1,540,056

UNITED STATES PATENT OFFICE.

HENRY CLAY, OF LONDON, ENGLAND.

PROPULSION OF SHIPS AND LIKE VESSELS.

Application filed April 12, 1921. Serial No. 460,617.

*To all whom it may concern:*

Be it known that I, HENRY CLAY, of Camden Town, London, England, a subject of the King of Great Britain and Ireland, have invented certain new and useful Improvements in and Relating to the Propulsion of Ships and the like Vessels, of which the following is a specification.

This invention relates to the propulsion of ships and has for its object the provision of means specially designed for propelling the improved type of ships and other vessels described in my co-pending application No. 460,616, filed April 12, 1921. It is pointed out however that my improved propelling means are also applicable to other types of vessels.

The improvements according to my present invention comprise the provision of means for the forward propulsion of the vessel combined with means for simultaneously forcing air in bulk under pressure beneath the bottom of the vessel, where the said air is accumulated to bodily raise the vessel above the surrounding water, thus greatly reducing the frictional resistance to the movement of the vessel through the water and enabling very high speeds of propulsion to be obtained.

In order that the nature of the invention may be clearly understood various arrangements in accordance therewith will now be described with the aid of the accompanying diagrammatic drawings in which—

Fig. 1 is a side view partly broken away of a small type of vessel equipped with improved propelling and air forcing means in accordance with my invention, the vessel being supposed to be under propulsion and therefore bodily lifted by compressed air above the water;

Fig. 2 is a similar view to Fig. 1 showing the vessel in a state of repose and therefore deeper in the water;

Fig. 13 is a plan view of a small type of craft such as is shown in Figs. 9 to 11 but provided with the modified form of aero-hydro screw propeller shown in Fig. 12, one on each side and extending beneath the whole length of the craft from stem to stern;

Fig. 14 is a side view of the craft shown in Fig. 13;

Fig. 15 is a side view of a small type of craft such as is shown in Figs. 13 and 14 but having a single aero-hydro screw propeller centrally arranged and extending beneath the bottom of the craft only to about amidships;

Fig. 16 is a plan view of the said modified arrangement shown in Fig. 15;

Figs. 17 and 18 illustrate details of the means which I employ for controlling the compression, accumulation, and exhaust, of the air beneath the bottom of the vessel;

Figs. 19 and 20 show in a side view and in perspective respectively, further means according to my invention for entrapping and forcing air beneath the bottom of the vessel by the forward motion of the latter, an ordinary stern drive being employed.

Figure 3:
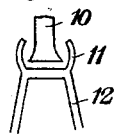
Fig. 3 illustrates a detail of construction which may be applied to the aero-hydro screw propeller shown in Figs. 1 and 2.
Figure 4:
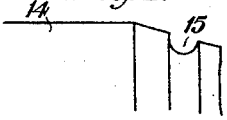
Figs. 4 and 5 illustrate details of a modified form of screw propeller.
Figure 5:
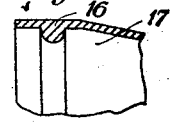
Figure 6:
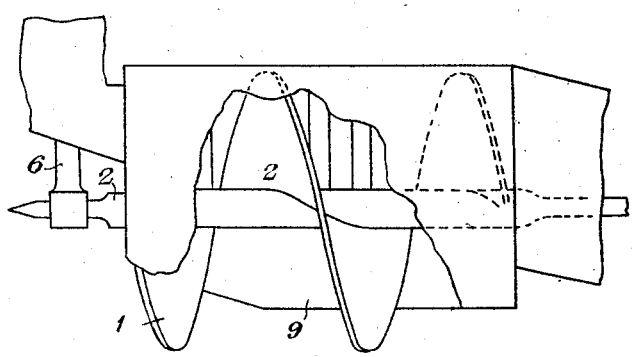
Fig. 6 illustrates on an enlarged scale the aero-hydro screw propeller shown in Figs. 1 and 2.

Referring to Figs. 1 to 16 of the drawings, illustrating the construction and various arrangements of the aero-hydro screw propeller for propelling a vessel and simultaneously forcing air beneath the bottom of the latter, the aero-hydro propeller 1 is shown in the forward part of the vessel mounted upon a shaft 2 which may be driven by any suitable kind of engine or motor arranged, in the example shown, in the central part of the vessel.

The forward end of the vessel terminates in the projecting bow portion 3 which is arranged over and projects beyond the aero-hydro screw propeller 1 (Figs. 1 and 2). The front bearing 4 for the driving shaft 2 is conveniently supported from the bow of the vessel by means of the bracket 5 and hanger 6 while the after bearing 7 is secured to the bottom 8 of the vessel (Fig. 1).

The aero-hydro screw propeller 1 is arranged within a central semi-cylindrical casing 9 (Figs. 1 and 6) enclosing the upper part of the screw which projects upwardly out of the water and rotates in air only. The interior of the semi-cylindrical casing 9 communicates with the atmosphere through the open inner end of the projecting bow portion 3 and by suitable passages with the air chutes containing bow plates referred to in my aforementioned co-pending application, the air chutes being arranged on either side of the central casing 9 so that the rotation of the screw in the proper direction for propelling the vessel forward forces air down from the semi-cylindrical casing 9 through the said passages into the said air chutes where the air is accumulated under pressure until it bodily raises the vessel above the surrounding water thus reducing the frictional water resistance to the progress of the vessel and greatly increasing the speed which can be imparted to the vessel.

In order to more effectually prevent the escape of air round the screw, the edge of the latter may be provided with a rubber tire 10 let into a recess 11 formed upon the edge of the hollow worm 12, as shewn in Fig. 3.

Figure 7:
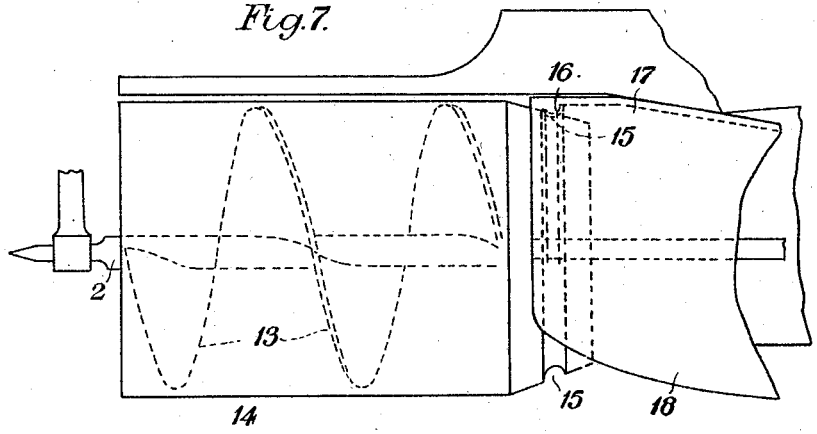
Fig. 7 illustrates the complete screw propeller of which details are shown in Figs. 4 and 5.
Figure 8:
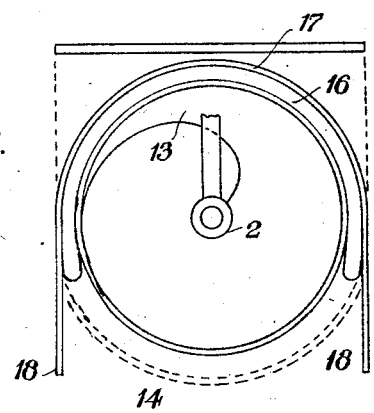
Fig. 8 is a front end view of the aero-hydro screw propeller shown in Fig. 7.

Figs. 4, 5, 7 and 8 show a form of the aero-hydro screw propeller in which the worm plate 13 is enclosed within a complete cylinder 14 to the interior of which the outer edges of the worm 13 are firmly secured while the inner edges of the worm are secured as before to the periphery of the hollow driving shaft 2. For preventing the escape of air with this arrangement, a groove 15 (Fig. 4) is provided round the after end of the cylinder 14 adapted to receive the rubber tire 16 which is fixed round the interior of the arched air chute 17 and extends below the water line to the lower straight parts of the air chute plates 18 as clearly shown in Figs. 5 and 8. The combined assemblage of these parts is shown in Fig. 7 in which it will be seen that the upper half of the cylinder 14 containing the screw and worm plate 13 rotates above the water line in airtight contact with the interior of the arched air chute 17 by means of the groove 15 and rubber tire 16. In this arrangement the after end of the cylinder 14 is preferably tapered slightly as shown so as to fit within the forward end of the arched air chute 17.

Figure 9:
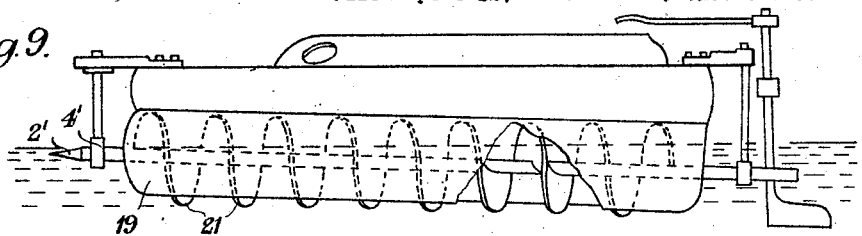
Fig. 9 shows in side view one way of applying my aero-hydro screw propeller to a small type of craft, which in this figure is supposed to be under propulsion.
Figure 10:
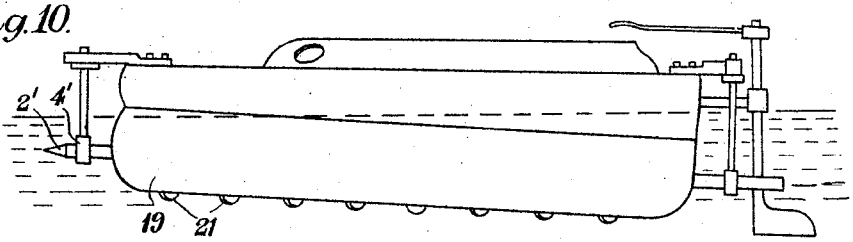
Fig. 10 is a side view of the craft shown in Fig. 9 but which in this figure is supposed to be at rest and therefore deeper in the water.
Figure 11:
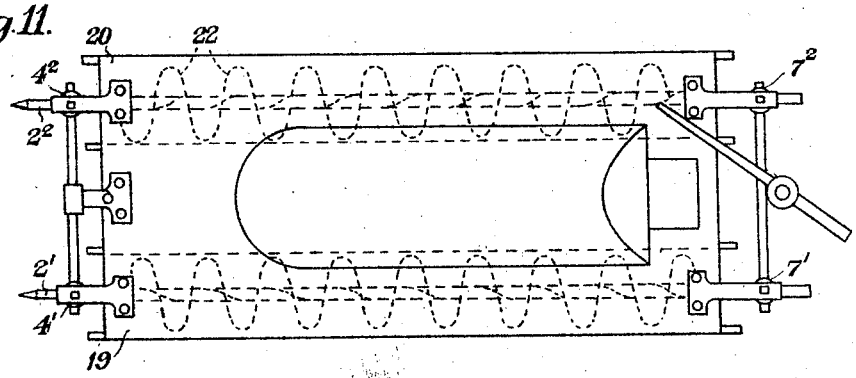
Fig. 11 is a plan view of the craft shown in Figs. 9 and 10.

Figs. 9 to 16 show various modified arrangements of the aero-hydro screw propeller which has already been described hereinabove. Figs. 9, 10 and 11 illustrate an arrangement for the application of this propelling device to a different type of vessel to that shewn in Figs. 1 and 2. In this arrangement two long parallel semi-cylinders 19, 20 are provided each enclosing an aero-hydro screw, such as 21 and 22, having a continuous worm formation extending throughout the length of the semi-cylinders. In this case the driving shafts $2'$ $2^2$ are supported in forward bearing $4'$ $4^2$ and after bearings $7'$ $7^2$ supported from the upper part of the vessel in the manner shown. On these semi-cylinders 19, 20 the vessel is built up. Power may be applied to drive these aero-hydro screws either at the bow or stern of the vessel. On the screws being driven the air entrapped by the worm plate at the bow end is passed down to a lower level beneath the water at the stern end thus providing an air buoyancy within each semi-cylinder which buoyancy is, wholly or partly, available for supporting the vessel, while in motion, above the general level of the surface of the water, the semi-cylinders and vessel travelling at a constant inclination as shown.

Fig. 10 shows the vessel at rest and Fig. 9 the same under propulsion and therefore higher out of the water than in Fig. 10.

Figs. 12 to 16 show an arrangement of the areo-hydro screw propeller in which a worm plate 13 is fixed round the interior wall of a complete cylinder 14 as already described with reference to Fig. 7, and a second worm plate 23 is also fixed around the exterior wall of the cylinder 14 thus increasing considerably the engaging surface of the screw in contact with the water.

Figs. 13 and 14 show the employment of two such complete cylinders fitted with interior and exterior worm plates, the arrangement being somewhat similar to that shewn in Figs. 9, 10 and 11. The two cylinders $14'$ and $14^2$ (Fig. 13) are arranged parallel to one another and extend the full length of the vessel, being mounted, as in the said former arrangement, on shafts $2'$, $2^2$ supported in forward bearings $4'$, $4^2$ and in after bearings $7'$, $7^2$. As the cylinders $14'$ and $14^2$ are rotated air and water are forced through their whole length by the worm plates 13 and 23, the cylinders being rendered buoyant by the entrapped air filling the upper parts of the same and thus enabling the cylinders to lift the vessel upon which they act through the supports of the bearings $4'$, $4^2$, $7'$, $7^2$. The said entrapped air is, in this arrangement, allowed to escape at the after end of the cylinders beneath the surface of the water.

Figure 12:
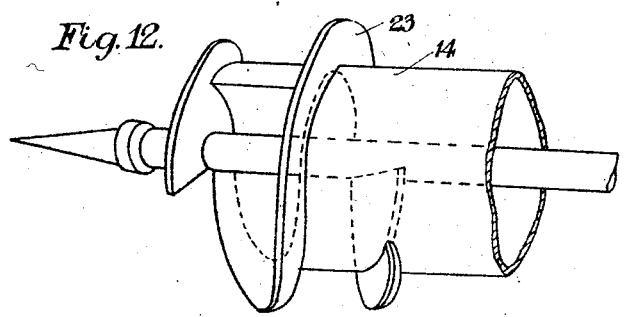
Fig. 12 shows to an increased scale a modification of the aero-hydro screw propeller shown in Fig. 7 provided with an exterior worm plate for propulsion purposes.

Figs. 15 and 16 show an arrangement in which a single aero-hydro screw such as that shewn in Fig. 12 is employed; the said screw both propelling the vessel and forcing air through the rotating cylinder 14. In this arrangement the after end of the cylinder 14 terminates at about the centre of the bottom of the vessel where the air forced by the screw is compressed and accumulated, the escape of air forward being prevented by the three trailing bow plates 24 as shewn in dotted lines in Fig. 16 of the kind described in my co-pending application No. 460,616.

In order to control the compression, accumulation, and exhaust of the air forced beneath the vassel any suitable means may be employed. For example, the pneumatic bow plates referred to in my co-pending application No. 460,616 may be employed for this purpose and may be operated by any suitable means such, for example, as the means diagrammatically shown in Figures 1, 2, 15, 16, 17 and 18 of the accompanying drawings.

Referring to the said figures the bow plates 24 are placed within the forward ends of the air chutes and are pivotally suspended from the bottom 8 of the vessel at the forward end on pivots 56. The action of these bow plates is automatic during the forward travel of the vessel at which time the said plates are allowed to work up and down within the air chutes. In certain circumstances, for instance when it is desired to reverse the direction of travel of the vessel, the bow plates can be raised close to, or flush with, the bottom 8 of the vessel, for which purpose any suitable means may be provided. In the ararngements illustrated the bow plates are raised when desired by means of levers 57 operated by chains 58 passing over guide rollers 59 and thence to winches 60 operated by means of manually actuated crank handles 61.

To prevent the escape of air round the edges of the bow plates 24 rubber flanges or the like 62 may be fitted to the edges of these plates as shown in Fig. 18. In this case the plates 24 may be raised when desired by means of arms 63 secured to the pivots 56 and bearing directly against the underside of plates 24, the pivots 56 being operated as before by the devices 57, 58, 59, 60, 61. Fig. 17 shows another device which may be employed for preventing the escape of air round the edges of the bow plates 24. In this arrangement a sheet 64 of a suitably flexible material is connected airtight at the upper part to the bow plate 24 and at the lower part to the air chute plates 18, the arrangement being such as to provide a kind of bellows chamber as will be seen in this figure. This arrangement can also be operated when desired by the devices already described and illustrated in Figs. 1, 2 and 18.

In the arrangement shown in Figs. 19 and 20 I provide and arrange, preferably somewhat above the deck of the vessel near the bow thereof, a hollow chamber or casing 65 of sheet or cast metal having an upper air inlet opening 66. This hollow casing 65 is made as narrow as possible in the transverse direction and is preferably tapered towards the forward edge 67 so as to provide a suitable formation for cutting through the water as the vessel advances, but the casing may have any desired length measured fore and aft. The lower part of the casing 65 is formed into an elongated nozzle or the like 68 which is carried right down beneath the bottom of the vessel with the nozzle outlet opening always in the water and facing towards the stern. This casing forming an air passage or duct terminating in a nozzle is secured and supported at the bow of the vessel by any desired and suitable means, either rigidly in one definite position, or upon a pivot, and in the latter case means may be provided for altering the position of the casing 65. In the arrangement illustrated the casing 65 is supported upon a pivot stud 69 and the elongated nozzle portion 68 is guided by an inverted U-shaped piece 70, the position of the casing being determined and controlled by means of a contact piece 71 abutting against the after side of the casing 65 at the upper part of the latter and operated by means of a screwed rod 72 working in a screw-tapped hole in a fixed block 73 and actuated by means of a hand wheel 74.

By rotating the hand wheel 74 in the proper direction the nozzle 68 can be raised close to the bottom of the vessel, for instance when the vessel is starting, and can be lowered into its normal position when the vessel has attained the desired speed.

Various modifications may be made in the details of the examples described above and illustrated in the drawings, and various accessory devices may be employed in arrangements of the kind referred to for propelling a vessel and simultaneously forcing air beneath the bottom of the same, without exceeding the scope of the present invention.

What I claim and desire to secure by Letters Patent is:—

1. In the propulsion of a vessel, the combination with an air chamber located beneath the bottom of the vessel, of a power-driven device for propelling the vessel, a hollow casing separate from but attached to the extreme bow end of the vessel having an upper portion above the water line and a lower portion extending beneath the vessel, an air inlet in the upper portion and an outlet in the said lower portion directed towards the stern and issuing into the water a suitable distance in front of the said air chamber, and means for varying the position of the outlet opening relatively to the bottom of the vessel.

2. In the propulsion of a vessel the combination with an air chamber located beneath the bottom of the vessel, of a power-driven device for propelling the vessel, a hollow casing separate from but pivotally supported at the extreme bow end of the vessel having an upper portion above the water line and a lower portion extending beneath the vessel, an air inlet in the upper portion and an outlet in the said lower portion directed towards the stern and issuing into the water a suitable distance in front of the air chamber, and means for varying the position of the outlet opening relatively to the bottom of the vessel.

In testimony whereof I have signed my name to this specification.

HENRY CLAY.